US008125335B2

(12) United States Patent
Manneschi

(10) Patent No.: US 8,125,335 B2
(45) Date of Patent: Feb. 28, 2012

(54) METAL DETECTOR GATE COMPRISING REFINED INDICATOR MEANS

(76) Inventor: Alessandro Manneschi, Arezzo (IT)

( * ) Notice: Subject to any disclaimer, the term of this patent is extended or adjusted under 35 U.S.C. 154(b) by 530 days.

(21) Appl. No.: 11/807,514

(22) Filed: May 29, 2007

(65) Prior Publication Data

US 2007/0290843 A1 Dec. 20, 2007

(30) Foreign Application Priority Data

May 30, 2006 (FR) ...................................... 06 04794

(51) Int. Cl.
*G08B 13/24* (2006.01)
(52) U.S. Cl. ......... 340/551; 340/550; 340/5.2; 340/5.32
(58) Field of Classification Search .................. 340/551, 340/552, 572.1, 815, 550, 5.32, 5.2; 324/323
See application file for complete search history.

(56) References Cited

U.S. PATENT DOCUMENTS

| 3,676,772 | A | * | 7/1972 | Lee | 324/233 |
| 3,893,092 | A | * | 7/1975 | Kessler | 340/502 |
| 3,997,787 | A | | 12/1976 | Fearon et al. | |
| 4,223,302 | A | * | 9/1980 | Hocking | 340/525 |
| 4,701,804 | A | * | 10/1987 | Toyoda et al. | 358/444 |
| 5,039,981 | A | * | 8/1991 | Rodriguez | 340/551 |
| 5,041,728 | A | * | 8/1991 | Spacher et al. | 250/366 |
| 5,121,105 | A | * | 6/1992 | Aittoniemi | 340/551 |
| 5,437,772 | A | * | 8/1995 | De Castro et al. | 205/775 |
| 5,440,135 | A | | 8/1995 | Shonka | |
| 5,446,288 | A | | 8/1995 | Tumer | |
| 5,600,303 | A | * | 2/1997 | Husseiny et al. | 340/568.1 |
| 5,689,184 | A | * | 11/1997 | Jeffers et al. | 324/243 |
| 5,751,049 | A | * | 5/1998 | Goodwin | 257/440 |
| 5,818,051 | A | * | 10/1998 | Dreiske et al. | 250/370.06 |
| 5,830,529 | A | * | 11/1998 | Ross | 427/152 |
| 5,854,533 | A | * | 12/1998 | Pappalardo | 313/487 |

(Continued)

FOREIGN PATENT DOCUMENTS

WO WO-2004-097456 11/2004

OTHER PUBLICATIONS

"Large-Area Radiation Portal/ Personnel Monitor" NTIS Tech Notes, US Department of Commerce.; Springfield, VA, US; Sep. 1, 1987; pp. 859-860.

*Primary Examiner* — Daniel Wu
*Assistant Examiner* — Rufus Point
(74) *Attorney, Agent, or Firm* — Blakely, Sokoloff, Taylor & Zafman

(57) ABSTRACT

The present invention relates to a metal detector gate comprising two uprights (12, 14) housing sensors forming a metal mass detector, particularly transmitter/receiver coils (20, 22), associated with a power supply and processing module (30), and defining between them a channel for individuals to be checked to pass through, at least one of the uprights (12, 14) comprising a series of light sources (40) distributed over its height to display alarms, characterized in that it also comprises a radioactive radiation detector (25) associated with the power supply and processing module (30) and that said module is suitable for controlling the light sources (40) so that a part of the colors generated by the light sources (40) is associated with the signals from the metal mass detector and a different series of colors is associated with the signals from the radioactive radiation detector.

15 Claims, 3 Drawing Sheets

U.S. PATENT DOCUMENTS

Figure 1:
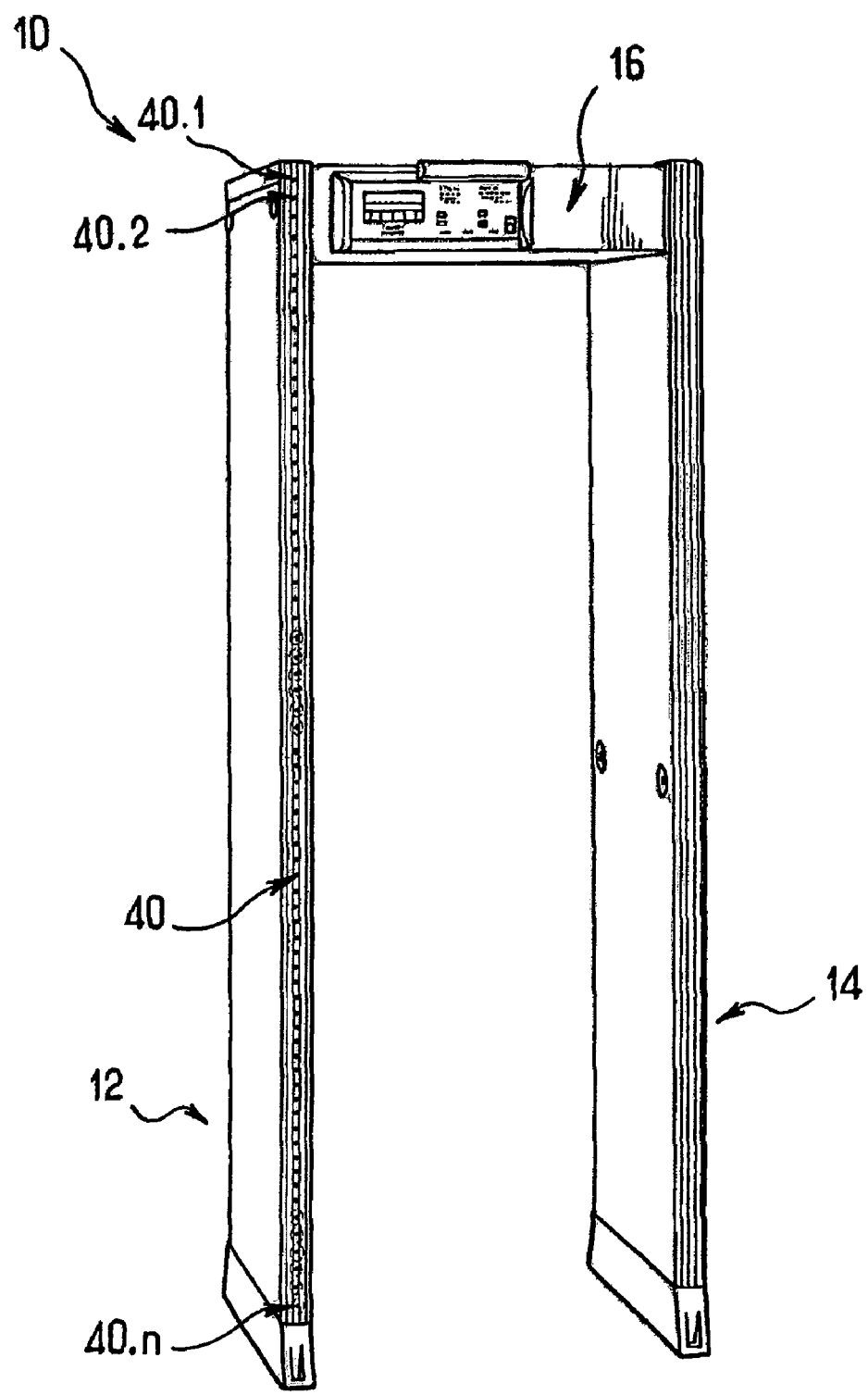

| Patent No. | | Date | Inventor | Class |
|---|---|---|---|---|
| 5,859,700 | A * | 1/1999 | Yang | 356/300 |
| 5,894,938 | A * | 4/1999 | Ichise et al. | 209/559 |
| 5,959,451 | A * | 9/1999 | De Torfino | 324/236 |
| 6,060,677 | A * | 5/2000 | Ulrichsen et al. | 209/577 |
| 6,084,351 | A * | 7/2000 | Kai et al. | 313/634 |
| 6,103,544 | A * | 8/2000 | Dreiske et al. | 438/48 |
| 6,107,001 | A * | 8/2000 | Lewis et al. | 430/302 |
| 6,122,091 | A * | 9/2000 | Russell et al. | 359/245 |
| 6,133,829 | A * | 10/2000 | Johnstone et al. | 340/551 |
| 6,160,617 | A * | 12/2000 | Yang | 356/300 |
| 6,171,885 | B1 * | 1/2001 | Fan et al. | 438/70 |
| 6,180,135 | B1 * | 1/2001 | Charych et al. | 424/450 |
| 6,243,219 | B1 * | 6/2001 | Hutcheson et al. | 359/885 |
| 6,334,365 | B1 * | 1/2002 | Linker et al. | 73/864.81 |
| 6,361,225 | B1 * | 3/2002 | Szajewski et al. | 396/604 |
| 6,459,955 | B1 * | 10/2002 | Bartsch et al. | 700/245 |
| 6,610,977 | B2 * | 8/2003 | Megerle | 250/287 |
| 6,696,947 | B1 * | 2/2004 | Bybee | 340/551 |
| 6,819,241 | B2 * | 11/2004 | Turner et al. | 340/551 |
| 7,098,789 | B2 * | 8/2006 | Manneschi | 340/551 |
| 7,145,328 | B2 * | 12/2006 | Manneschi | 324/228 |
| 7,193,524 | B2 * | 3/2007 | Castle et al. | 340/693.5 |
| 7,220,968 | B2 * | 5/2007 | Burger et al. | 250/370.01 |
| 7,319,321 | B2 * | 1/2008 | Murray et al. | 324/244 |
| 7,408,461 | B2 * | 8/2008 | Fluck | 340/551 |
| 2001/0026222 | A1 * | 10/2001 | Canady et al. | 340/573.1 |
| 2003/0085348 | A1 * | 5/2003 | Megerle | 250/287 |
| 2003/0116436 | A1 * | 6/2003 | Amirkhanian et al. | 204/452 |
| 2004/0000999 | A1 * | 1/2004 | Turner et al. | 340/572.4 |
| 2004/0046550 | A1 | 3/2004 | Kondo | |
| 2004/0217862 | A1 * | 11/2004 | Castle et al. | 340/552 |
| 2006/0243071 | A1 * | 11/2006 | Sagi-Dolev | 73/865.8 |

* cited by examiner

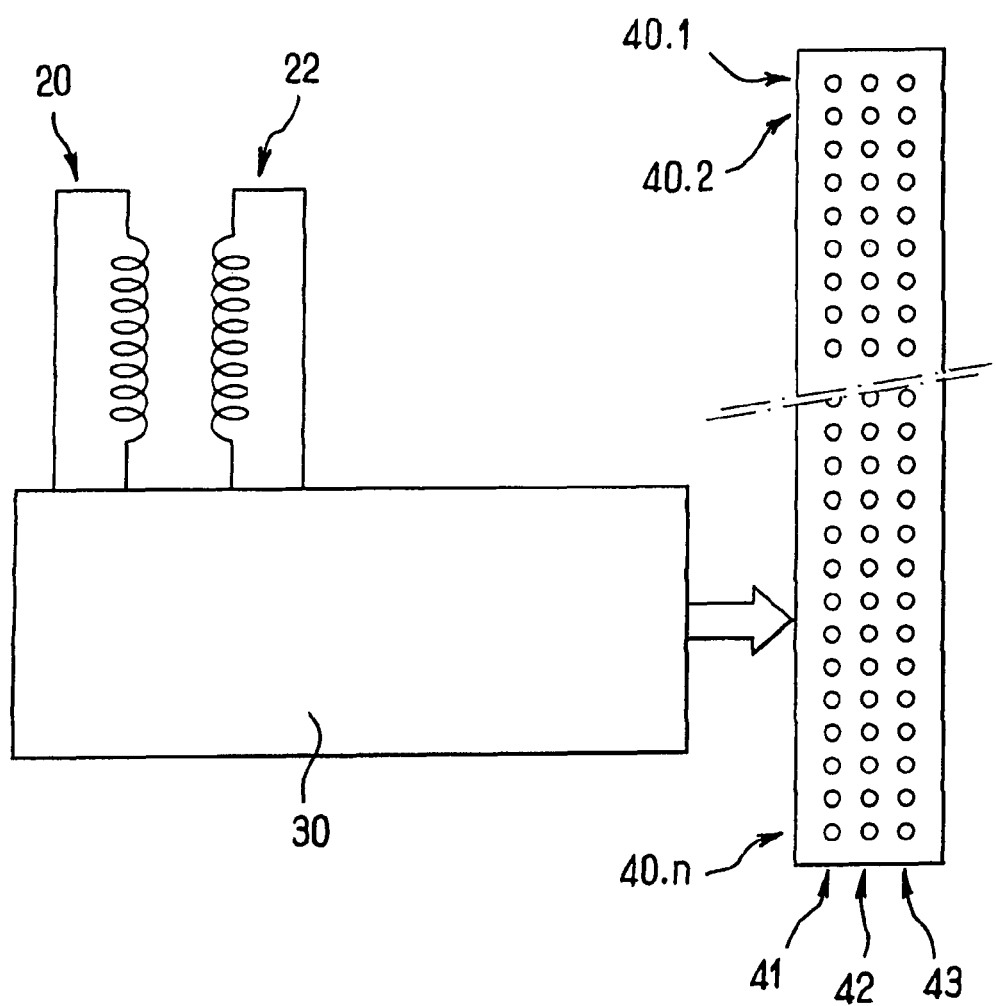
FIG_3

METAL DETECTOR GATE COMPRISING REFINED INDICATOR MEANS

The present invention relates to the field of metal detectors.

In particular, the present invention relates to the metal detectors intended to control access to sensitive environments, such as, without attempting to be exhaustive, airports, banks, embassies, military installations, museums, and so on.

It is known that most metal detector systems proposed in this context comprise transmitter coils, receiver coils and an electronic processing circuit suitable for detecting signal variations received on the receiver coils, relative to a reference value.

These detectors normally take the overall form of a gate or tunnel through which pass the individuals, even the equipment, to be checked.

Exemplary embodiments of known detectors can be found in documents FR-A-2720519, FR-A-2773350, FR-A-2516251, FR-A-2610417, FR-A-2607937, FR-A-2697919, FR-A-2698178 and FR-A-2698968, IT 1271382, IT 1216946, IT 1260208, IT 1249278, IT 1214991 and FN 913502.

The known metal detectors have given great service.

However, they do not always give satisfaction.

In practice, these days, it is turning out to be not enough to detect the carrying of metallic objects at the entrance to sensitive sites.

In particular, it is also proving necessary to detect in particular the possible presence of sources or particles emitting radioactive radiations. And because of the complexity of the detections required, the passage formed by the metal detectors often slows down the flow of people seeking to access the so-called sensitive environment, for example a museum, an airport boarding lounge, and so on.

Such a slowing-down factor is obviously a source of discomfort and discontent, particularly when, in the case of an airport boarding lounge, the issue is to access an aircraft scheduled for immediate take-off, and/or, generally, when the passage through the metal detectors leads to a long wait, particularly for all the people liable to difficulty when faced with a prolonged wait in a standing position, such as elderly people.

Information procedures have been put in place to prepare the user for passing through the metal detectors, for example by previously informing the user of the need to remove a jacket or equivalent and to often place certain objects, such as mobile phones, coins, etc., into trays provided for this purpose.

However, these procedures have not provided for any significant time-saving when passing through the detectors.

For his part, after lengthy observations, the Applicant has observed that the delay caused when passing through such detectors is partly due to the time required to enable the security people operating the detectors to understand the message generated by the detector and, where appropriate, to lead to additional investigations before allowing the user to access the sensitive area.

Those skilled in the art know that, these days, two types of message are delivered by the known metal detector gates: audible messages and/or visual messages. Regarding the audible messages, the known gates are more specifically normally designed to emit a sound if an unauthorized metal object is detected and, on the other hand, remain silent if no prohibited object is detected. Regarding the visual messages, the known gates are normally designed either to deliver text information on a screen, or to power a light source or a series of light sources distributed over the height of the gate to show the height at which the suspect object has been detected.

Document WO 2004/097456 suggested, in a dismantlable gate, using a display based on multi-colored light-emitting diodes to display the magnitude of the detected signal. However, such a proposal has not hitherto been developed industrially. In practice, the use of multi-colored diodes to display the amplitude of the signal leads to interpretation difficulties for the people in charge of monitoring the flows of people using metal detectors.

Given this state of the art, the aim of the present invention is to propose novel means for improving the situation, in particular facilitating the transfer of the people being checked by speeding up the analysis of the alarm signals by the security personnel.

This aim is achieved in the context of the present invention through a metal detector gate comprising two uprights housing sensors forming a metal mass detector, particularly transmitter/receiver coils, associated with a power supply and processing module, and defining between them a channel for individuals to be checked to pass through, at least one of the uprights comprising a series of light sources distributed over its height to display alarms, characterized in that it also comprises a radioactive radiation detector associated with the power supply and processing module and that said module is suitable for controlling the light sources so that a part of the colors generated by the light sources is associated with the signals from the metal mass detector and a different series of colors is associated with signals from the radioactive radiation detector.

According to another advantageous characteristic of the present invention, the power supply and processing module and the series of light sources are also suitable for generating optical radiations of different colors according to the nature of the signal detected by the sensor forming the metal mass detector.

Figure 2:
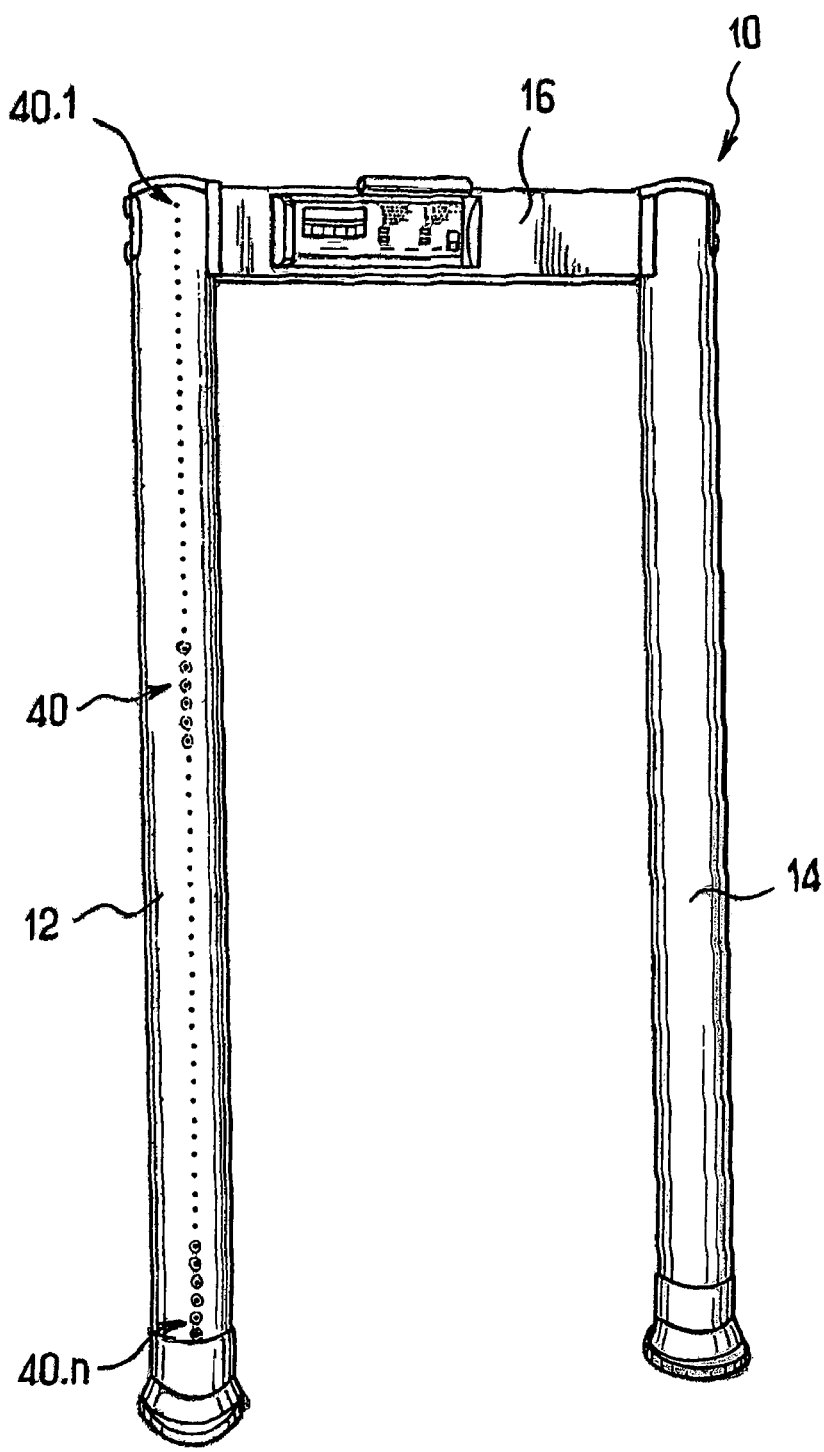

Other characteristics, aims and advantages of the present invention will become apparent from reading the detailed description that follows, and in light of the appended drawings, given by way of non-exhaustive examples, and in which:

FIG. 1 represents a perspective diagrammatic view of a metal detector gate according to a first embodiment of the present invention, FIG. 2 represents a similar perspective view of a metal detector gate according to a second variant of embodiment of the present invention, and FIG. 3 represents a diagrammatic view of the main means comprising a gate according to the present invention.

The appended FIGS. 1 and 2 show metal detector gates 10 according to the present invention. These gates 10 comprise, in a manner known per se, a U-shaped structure comprising two vertical uprights 12, 14, linked at their top by horizontal cross-member 16. The latter can be equipped with any display device and/or any intrinsically conventional control element.

The two uprights 12, 14 house the coils 20, 22, diagrammatically represented in FIG. 3, linked to a power supply and control or processing module 30.

Some of the coils constitute transmitters 20 and the others constitute receivers 22. The same coils can, moreover, alternately constitute transmitter and/or receiver.

Numerous variants of embodiment of such coils 20, 22 and associated power supply and control module 30 are well known to those skilled in the art and will not be described in detail hereinafter.

FIG. 3 diagrammatically shows a single transmitter coil 20 and a single receiver coil 22. In practice, the structure of the coils is, however, much more complex, preferably to form multiple channels.

Thus, to date, often familiar in the gates are structures comprising at least 5 to 8 transmitter coils and at least 5 to 10 receiver coils.

The function of the module 30 is to analyze the signal sampled on a receiver coil 22 to detect the presence of metals influencing the magnetic and/or electrical field and therefore the coupling between the transmitter coil or coils and receiver coil or coils, and, where appropriate, according to the configuration of the coils and the nature of the processing provided by the module 30, the geometry of the detected objects, their density, their weight, and so on.

The configuration of the coils 22 and the nature of the signals, and the processing provided by the module 30 are these days designed to provide an increasingly fine analysis of the objects carried by the individuals to be checked who are passing through the gate 10.

It will be understood from examining FIGS. 1 and 2 that the gate 10 in fact defines a passage, between the uprights 12, 14 through which the people to be checked pass.

As can be seen in FIG. 3, the device according to the present invention also comprises a sensor 25 forming a radioactive radiation detector, associated with the module 30. Such a sensor 25 can comprise any appropriate detector, for example a Geiger sensor, even a gamma detector or equivalent.

Even more specifically, FIG. 1 represents a gate of the so-called panel type. In this case, the uprights 12, 14 have a generally flat or paneled shape, that is, a small thickness transversely to the direction of passage and a significant width parallel to that direction. Represented in FIG. 2, however, is a so-called column gate. In this case, the uprights have a shape that is roughly circular of revolution.

According to the invention, as stated previously, at least one of the uprights 12, 14 carries a vertical strip 40 of light sources distributed over its height.

The module 30 is suitable for controlling the light sources 40 so that the latter emit a first color on detecting metal masses and emit a second color, different from the first color, on detecting a radioactive radiation.

Preferably, but non-exhaustively, the module 30 is suitable for controlling the light sources 40 so that the latter emit a red color on detecting metal masses, emit a blue color on detecting a radioactive radiation and emit a green color in the absence of an alarm.

According to another advantageous characteristic of the present invention, the module 30 and the associated light sources 40 can be suitable for generating a light radiation of different colors according to the nature of the signal detected on the receiver winding or windings 22 by the module 30.

More specifically, as diagrammatically represented in the appended figures, the strip 40 comprises n sets of sources 40.1, 40.2, ..., 40.n, distributed over the height of the upright. The number of sets 40 thus distributed over the height of an upright depends on the resolution of the geographic detection that is desired for the display.

Each of the n sets 40 can comprise a single source designed to emit a light wave of variable wavelength according to the excitation applied by the module 30.

As a variant, each set 40 can, as diagrammatically represented in FIG. 3, comprise a number of sources 41, 42, 43 suitable for respectively emitting optical radiations of different wavelengths, the optical sources 41, 42, 43 forming each set 40 being selectively powered by the module 30 according to the signal detected. As a nonlimiting example, the sources 41 can emit a red color on detecting a metal mass, the sources 42 can emit a blue color on detecting a radioactive radiation and the sources 43 can emit a green color if no anomaly is detected.

FIG. 3 diagrammatically shows three light sources forming each set 40. This particular embodiment is, however, given purely for illustration and is not exhaustive.

In the context of the present invention, the control of the light sources 40, and consequently of the emitted wavelength can depend on various parameters, in addition to distinguishing between the detection of metal masses and the detection of radioactive radiation.

It might be the intensity of the detected signal representative of a metal, that is, overall, of the size of the duly detected mass.

It might also be the nature of the detected metal, the emitted color making it possible, for example, to distinguish between a non-magnetic material, a magnetic material, stainless steel, and so on.

Obviously, the present invention is not limited to the particular embodiments that have just been described, but can be extended to any variant that conforms to its spirit.

In practice, when a suspect object is detected, the module 30 can drive the power supply of a number of adjacent sources 40, according to the size of the detected object, as diagrammatically illustrated in the appended figures.

As a variant, it is possible for example, to provide for having a strip 40 of light sources on each of the two uprights 12 and 14 and, where appropriate, on each of the upstream and downstream sides, in relation to the direction of passage, of the latter.

In the case where a strip 40 is provided on each of the uprights 12, 14, it is also possible to provide for driving the two strips differently according to the lateral horizontal position of the detected objects: identical power supply for both strips 40 for an object detected in the centre of the gate, power supply only for the strip 40 located on the left side of the gate for an object detected on the left side of the gate and power supply only for the strip 40 located on the right side of the gate for an object detected on the right side of the gate. Obviously, in this context, the strips 40 can simultaneously display multiple objects detected at different heights (on both strips for objects detected in the middle of the gate, and on a single strip for objects detected on one side of the gate). This arrangement makes it possible to provide an indication as to the geometric location of the detected objects, both height-wise and in terms of horizontal or lateral position.

Those skilled in the art will understand that the present invention offers numerous advantages over the gates known in the state of the art. In practice, the gate according to the present invention makes it possible to provide decisive additional information making it possible to display immediately and simultaneously the nature of the detection and its location. The gate according to the present invention thus allows security personnel to react immediately and makes it possible to speed up the transfer flow of people to be checked.

According to another advantageous characteristic of the present invention, the module 30 is suitable for driving the emission of a specific color, for example violet, on detecting lead or any equivalent material likely to form an enclosure concealing a radioactive source.

The invention claimed is:

1. Metal detector gate comprising two uprights (12, 14) housing sensors forming a metal mass detector, particularly transmitter/receiver coils (20, 22), associated with a power supply and processing module (30), and defining between them a channel for individuals to be checked to pass through, each of the uprights (12, 14) comprising a series of light sources (40) distributed over its height to display alarms, characterized in that it also comprises a radioactive radiation detector (25) associated with the power supply and processing module (30) and that said module is suitable for controlling the light sources (40) so that said light sources emit a first color on detecting metal masses and emit a second color, different from the first color, on detecting a radioactive radiation, and wherein the power supply and processing module 30 is suitable for driving the two series of light sources (40) provided respectively on each of the two uprights (12, 14) differently according to the lateral horizontal position of the detected objects and said metal detector gate further comprises:
  i) identical power supplies for the two series of sources (40) for an object detected in the center of the gate,
  ii) a power supply only for the series of sources (40) located on the left side of the gate for an object detected on the left side of the gate, and
  iii) a power supply only for the series of sources (40) located on the right side of the gate for an object detected on the right side of the gate.

2. Gate according to claim 1, characterized in that the power supply and processing module (30) and the series of light sources (40) are suitable for generating optical radiations of different colors according to the nature of the signal detected by said module (30) on the receiver coils (22).

3. Gate according to claim 1, characterized in that the series of light sources (40) distributed over the height of an upright comprises n sets of sources (40.1, 40.2, . . . , 40.n), distributed over the height, each set comprising a single source suitable for emitting a lightwave of different color according to its excitation.

4. Gate according to claim 1, characterized in that the series of light sources (40) distributed over the height of an upright comprises n sets of sources (40.1, 40.2, . . . , 40.n), distributed over the height, each set comprising several light sources suitable for emitting optical radiations of different wavelength according to the received excitation signal.

5. Gate according to claim 1, characterized in that the color emitted by a light source (40) depends on the intensity of the detected signal representative of a metal.

6. Gate according to claim 1, characterized in that the color emitted by a light source (40) depends on the size of the detected metal mass.

7. Gate according to claim 1, characterized in that the color emitted by a light source (40) depends on the nature of the detected metal.

8. Gate according to claim 1, characterized in that the color emitted by a light source (40) makes it possible to distinguish between a non-magnetic material, a magnetic material and stainless steel.

9. Gate according to claim 1, characterized in that the module (30) is suitable for controlling the light sources (40) so that the latter emit a red color on detecting metal masses and emit a blue color on detecting a radioactive radiation.

10. Gate according to claim 1, characterized in that the module (30) is suitable for controlling the light sources (40) so that the latter emit a first color on detecting metal masses, emit a second color on detecting a radioactive radiation and emit a third color in the absence of an alarm.

11. Gate according to claim 10, characterized in that the module (30) is suitable for controlling the light sources (40) so that the latter emit a red color on detecting metal masses, emit a blue color on detecting a radioactive radiation and emit a green color in the absence of an alarm.

12. Gate according to claim 1, characterized in that the module (30) is suitable for driving the emission of a specific color, on detecting lead or any equivalent material likely to form an enclosure concealing a radioactive source.

13. Gate according to claim 1, characterized in that the module (30) is suitable for driving the emission of a violet color, on detecting lead or any equivalent material likely to form an enclosure concealing a radioactive source.

14. Gate according to claim 1, characterized in that it comprises a series of light sources (40) for displaying alarms, on each of the two uprights (12, 14).

15. Gate according to claim 1, characterized in that it comprises a series of light sources (40) for displaying alarms, on each of the upstream and downstream sides of the uprights (12, 14), in relation to the direction of passage, of the latter.

* * * * *